(12) United States Patent
Fernandez Hernandez

(10) Patent No.: US 10,732,290 B2
(45) Date of Patent: Aug. 4, 2020

(54) METHOD AND SYSTEM TO OPTIMISE THE AUTHENTICATION OF RADIONAVIGATION SIGNALS

(71) Applicant: The European Union, represented by the European Commission, Brussels (BE)

(72) Inventor: Ignacio Fernandez Hernandez, Watermael-Boitsfort (BE)

(73) Assignee: THE EUROPEAN UNION, REPRESENTED BY THE EUROPEAN COMMISSION, Brussels (BE)

( * ) Notice: Subject to any disclaimer, the term of this patent is extended or adjusted under 35 U.S.C. 154(b) by 763 days.

(21) Appl. No.: 15/302,356

(22) PCT Filed: Mar. 23, 2015

(86) PCT No.: PCT/EP2015/056120
§ 371 (c)(1),
(2) Date: Oct. 6, 2016

(87) PCT Pub. No.: WO2015/154981
PCT Pub. Date: Oct. 15, 2015

(65) Prior Publication Data
US 2017/0031028 A1    Feb. 2, 2017

(30) Foreign Application Priority Data
Apr. 8, 2014    (EP) .................................... 14163902

(51) Int. Cl.
*G01S 19/21*    (2010.01)
*G01S 19/02*    (2010.01)
*H04L 9/32*    (2006.01)

(52) U.S. Cl.
CPC ............ *G01S 19/215* (2013.01); *G01S 19/02* (2013.01); *H04L 9/3242* (2013.01)

(58) Field of Classification Search
CPC . G01S 19/02; G01S 19/21–215; H04L 9/3242
See application file for complete search history.

(56) References Cited

PUBLICATIONS

A. Perrig et al. Timed Efficient Stream Loss-Tolerant Authentication (TESLA): Multicast Source Authentication Transform Introduction, Carnegie Mellon University, Network Working Group, 2005, pp. 1-22.

(Continued)

*Primary Examiner* — Cassi J Galt
(74) *Attorney, Agent, or Firm* — Cantor Colburn LLP

(57) ABSTRACT

A radio navigation system (100; 400), comprising a plurality of satellite-borne transmitters (110, 114, 118, 122) and at least one ground-based receiver (104), the receiver (104) being adapted to receive radionavigation signals (112, 116, 120, 124; 412, 416, 420, 424) from each of a plurality of the transmitters (110, 114, 118, 122). Each of the transmitters (110, 114, 118, 122) and the receiver (104) being adapted to access a predetermined first key chain, the first key chain comprising a first encryption key (K; $K_j$) and one or more further encryption keys (K; $K_{j,1}$, $K_{j,2}$, $K_{j,3}$, $K_{j,4}$). The system may comprise a first group of transmitters from said plurality of transmitters (110, 114, 118, 122), each transmitter in the first group of transmitters being operable to transmit a first radio navigation signal (112, 116, 120, 124; 412, 416, 420, 424), the first radionavigation signals including, at a given instant or for a given subframe (k, k+1), radionavigation data, a MAC (MAC1, MAC2, MAC3, MAC4), and one of said one or more further encryption keys (K; $K_{j,1}$, $K_{j,2}$, $K_{j,3}$, $K_{j,4}$). The MAC code (MAC1, MAC2, MAC3, MAC 4) is unique to each transmitter (110, 114, 118, 122) and is generated using the first encryption key (K; $K_j$,) and (Continued)

the one of said one or more further encryption keys (K; $K_{j,1}$, $K_{j,2}$, $K_{j,3}$, $K_{j,4}$) is transmitted a predetermined time after transmission of the MAC. The receiver (104) is operable, upon receipt of all or part of the first radionavigation signal (112, 116, 120, 124; 412, 416, 420, 424) from one or more of the first group of transmitters (110, 114, 118, 122), to authenticate a first radionavigation signal received from one of the first group of transmitters based on one of said one or more further encryption keys (K; $K_{j,1}$, $K_{j,2}$, $K_{j,3}$, $K_{j,4}$) received from that transmitter or from any other transmitter in said first group of transmitters. The same key K may be used for all transmitters in the first group, or each transmitter may use different key from the key chain. The transmitters may be formed into a second group, in addition to the first, with the second group using its own key chain in a similar manner. An advantage is to increase the availability of an authenticated position even in degraded reception environments. Embodiments also relate to the optimal transmission of authentication information—though the use of unpredictable bits interleaved with predictable bits—so as to minimize the signal predictability time and the increase of robustness against replay attacks.

25 Claims, 3 Drawing Sheets

(56) References Cited

PUBLICATIONS

Christian Wullems et al. "Signal authentication and integrity schemes for next generation global navigation satellite systems", In Proceedings of the European Navigation Conference GNSS, Jul. 22, 2005, pp. 1-11, XP055141309, URL:http://eprints.qut.edu.au/38275/1/wullems_SignalAuth.pdf.

G. T. Becker et al. "Efficient Authentication Mechanisms for Navigation Systems—a Radio-Navigation Case Study", Proceedings of ION GNSS, Sep. 22, 2009, pp. 901-912, XP055001591.

International Search Report dated Jul. 13, 2015 re: Application No. PCT/EP2015/056120; pp. 1-3; citing: Wullems et al. "Signal Authentication . . . ", K. Wessen et al. "Practical Cryptographic . . . ", Becker et al. "Efficient Authentication . . . ", Kyle D Wessen et al "A Proposed Navigation . . . ".

K. Wesson et al. "Practical Cryptographic Civil GPS Signal Authentication", Navigation, Sep. 1, 2012, vol. 59, No. 3, pp. 177-193, XP055048538.

Kyle D. Wesson et al. "A Proposed Navigation Message Authentication Implementation for Civil GPS Anti-Spoofing", GNSS—Proceedings of the 24th International Technical Meeting of thte Satellite Division of the Institute of Navigation (ION GNSS), Sep. 23, 2011, pp. 3135-3138, XP056000680.

Sherman C. Lo et al. "Assessing the Security of a Navigation System: A Case Study using Enhanced Loran", Stanford University, 2009, pp. 1-11.

Written Opinion dated Jul. 13, 2015 re: Application No. PCT/EP2015/056120; pp. 1-7; citing: Wullems et al. "Signal Authentication . . . ", K. Wessen et al. "Practical Cryptographic . . . ", Becker et al. "Efficient Authentication . . . ", Kyle D Wessen et al "A Proposed Navigation . . . ".

METHOD AND SYSTEM TO OPTIMISE THE AUTHENTICATION OF RADIONAVIGATION SIGNALS

TECHNICAL FIELD

The present invention relates to authentication of satellite radio-navigation signals, and more particularly to a method and system for authenticating satellite navigation data and signals optimized for environments with difficult reception conditions.

BACKGROUND ART

Through the use of systems such as GPS, satellite navigation has become a critical element of society and economy. However, in spite of their high importance, Global Navigation Satellite Systems (GNSS) civil signals are very easy to forge. They are transmitted and received at a very low power (around −160 dBW, or $10^{-16}$ Watts), meaning that a device transmitting counterfeit signals at a low power can take control of a GNSS receiver. Currently, civil GNSS signals do not provide any means of determining the authenticity of these signals in order to prevent such attacks, although it is believed such a feature may be implemented in some GNSS in the future. However, some GNSS signal and data authentication measures have been proposed, as will be discussed below.

The term "authentication" in the satellite navigation domain refers in general to the authenticity of a position calculated from navigation satellite signals. In order to authenticate a position, the authenticity of the signals used in the position calculation need to be assured and, in addition to that, the receiver must ensure that the internal process to calculate this position has not been forged. As used herein, "authentication" primarily means signal authentication. The two main pieces of information that a receiver extracts from the GNSS signals are the satellite position and time information (contained in the navigation message), and the signal time-of-arrival (which is obtained in most receivers by code phase measurements). Therefore, authentication of radionavigation signals refers to the confirmation of the authenticity and integrity of the data transmitted from the satellite, and the authentication of the signal time of arrival (TOA) measured by the receiver.

As Direct Sequence Spread Spectrum (DSSS) Code Division Multiple Access (CDMA) signals, GNSS signals contain a bitstream of data modulated on a spreading code that spreads the signal power across a certain bandwidth, and which is also used for the calculation of time of arrival. Authentication measures are divided in those related to spreading-codes and those related to navigation data, also called navigation message authentication (NMA).

Elements of the present invention are based on aspects of the TESLA (Timed Efficient Stream Loss-Tolerant Authentication) protocol for radionavigation message authentication.

A. Perrig et al. "*Timed Efficient Stream Loss-Tolerant Authentication (TESLA): Multicast Source Authentication Transform Introduction*, (2005, *Carnegie Mellon University, Network Working Group*) introduces the concept of TESLA as a method to allow a receiver of multicast or broadcast information from a sender to check the integrity and authenticate information. TESLA uses symmetric cryptography, and time-delayed key disclosure to achieve asymmetry property and therefore minimizing key management tasks. The paper refers specifically to the use of TESLA in authentication of data packages in the context of network communications. It does not refer to its application into radiolocation or radionavigation, or to satellite communications. The authors do not propose the use of the TESLA protocol in radionavigation, and do not analyze its availability under fading and shadowing transmission channels.

Sherman C. Lo, et al., "Assessing the Security of a Navigation System: A Case Study using Enhanced Loran", Stanford University, discusses an adapted version of TESLA for navigation channels in enhanced Loran, for example in which a given key is used for several MACs. Authentication is discussed in relation to key cryptography, as well as other techniques for enhancing the security of Loran. The TESLA data authentication technique is discussed in one section, and is the known technique discussed hereinabove. The authors set out an adaptation of TESLA for navigation channels, to make it more suitable for Loran. It is stated that one modification in order to be more tolerant of message loss in a data efficient manner is to use a given key for several MACs.

C Wullems et al.: "Signal Authentication and Integrity Schemes for Next Generation Global Navigation Satellite Systems", Proceedings of the European Navigation Conference GNSS, 22 Jul. 2005 (2005-07-22), pages 1-11, XP055141309, Munich, discloses techniques for NMA-based authentication of GNSS signals based on TESLA. A transmitter generates a key chain by hashing function F. Authentication is performed, for the current timeslot, by determining whether there is a match between (i) a MAC ($MAC'_{n+2}$) derived from MACs obtained from a first (data) type of message during a previous timeslot and a key ($K'_{n+2}$) obtained by applying a secure key generation function F' to a key ($K_{n+2}$) obtained from a second type of message during the current timeslot, and (ii) a MAC ($MAC'_{n+2}$) obtained from the second type of message during the previous timeslot.

Known systems making use of TESLA for radionavigation signal authentication are based on the following steps:
the generation for each transmitter i, from an initial random seed $K_{i,n}$, of a chain of keys $K_{i,n}$ to $K_{i,0}$ generated recursively through a one-way function, and the use of the said one-way chain in reverse order ($K_{i,0}$ to $K_{i,n}$), whereby, at a certain time slot j, a transmitter i of the radionavigation system authenticates its broadcast data with a message authentication code ($MAC_{i,j}$) that uses the said key $K_{i,j}$ from the said one way chain;
the transmission by each transmitter i of the data to authenticate, together with the said MAC and, after a certain period of time, the said key $K_{i,j}$;
the reception by the receiver from each transmitter of the transmitter data, the $MAC_{i,j}$ and the key $K_{i,j}$;
the verification by the receiver of the authenticity of the satellite data by the generation of $MAC_{i,j}$ with the data itself and $K_{i,j}$, and the comparison with the $MAC_{i,j}$ received from the satellite i;
the verification by the receiver, for each of the signals from each said transmitter i, of the authenticity of $K_{i,j}$ by performing the one-way function recursively to generate a previous key of the chain, for example $K_{i,0}$, that is certified as authentic from a previously received certificate.

Therefore, known uses of TESLA protocols for radionavigation follow an approach whereby each signal from each transmitter is authenticated independently, and a problem is that all the required data for the authentication process needs to be received from the transmitter whose data is to be authenticated.

A further problem with conventional systems is that they do not provide the possibility to optimally use data from one satellite to authenticate other satellites and minimize the total number of bits required for the authentication of several satellites. They also do not provide the possibility to use the data from satellites with potentially better reception conditions to authenticate other satellites.

These factors represent a major problem for some radio-navigation systems, such as those based on satellite navigation, where the reception conditions can be generally degraded and can vary significantly for different satellites due to local obstructions in certain terrestrial environments, for example urban or suburban areas.

The disclosure enables authentication of radio-navigation signals with an optimum level of robustness and availability, including environments where the signal reception and data demodulation conditions prevent the successful demodulation of all the data from all the radio-navigation transmitters.

BRIEF SUMMARY

In one aspect of the invention there is provided a radio navigation system, comprising a plurality of satellite-borne transmitters and at least one ground-based receiver, the receiver being adapted to receive radionavigation signals from each of a plurality of the transmitters, each of the transmitters and the receiver being adapted to access a predetermined first key chain, the first key chain comprising a first encryption key and one or more further encryption keys, the system comprising: a first group of transmitters from said plurality of transmitters, each transmitter in the first group of transmitters being operable to transmit a first radio navigation signal, the first radionavigation signals including, at a given instant or for a given subframe, radionavigation data, a message authentication code (MAC), and one of said one or more further encryption keys; wherein the MAC is unique to each transmitter and is generated using the first encryption key; wherein the one of said one or more further encryption keys is transmitted a predetermined time after transmission of the MAC; and wherein the receiver is operable, upon receipt of all or part of the first radionavigation signal from one or more of the first group of transmitters, to authenticate a first radionavigation signal received from one of the first group of transmitters based on one of said one or more further encryption keys received from that transmitter or from any other transmitter in said first group of transmitters.

The receiver may be operable to authenticate the first radionavigation signal using the received one of said one or more further encryption keys or using another of said one or more further encryption keys derivable therefrom.

Preferably, the receiver is operable to authenticate the received first radionavigation signal based on the received one of said one or more further encryption keys upon receipt of at least the radionavigation data and MAC of that first radionavigation signal.

The or each first radionavigation may be in multiple parts, such that the encryption key is transmitted a predetermined delay after the radionavigation data and/or the MAC.

In one embodiment, the transmitted encryption key is the same for all transmitters within the first group. In one another embodiment, the transmitted encryption key comprises, for each transmitter of the first group, a different one from said first key chain.

For each subframe of the first radionavigation signal, each encryption key of said first key chain may comprise one of n encryption keys recursively derived from a one way function. Preferably, n is approximately equal to and in any event greater than the total number of satellite-borne transmitters in said radio navigation system.

For each transmitter of the first group, a respective MAC may be derived from a root key of the first key chain.

The receiver may be adapted to authenticate the received radionavigation signal by generating a derived MAC based the received radionavigation data and the received one of said one or more further encryption keys and comparing the derived MAC with the received MAC.

In one embodiment, first group of transmitters comprises all of said plurality of transmitters in the radio navigation system.

In another embodiment, the first group of transmitters comprises a strict subset of said plurality of transmitters in the radio navigation system. The remaining transmitters may comprise a second group of transmitters, wherein a predetermined second key chain is accessible by the second group of transmitters and the receiver, the second key chain comprising a first encryption key and one or more further encryption keys. Preferably, each transmitter in the second group is operable to transmit a second radio navigation signal, the second radionavigation signals including, at a given instant or for a given subframe, radionavigation data, a MAC, and one of said one or more further encryption keys; wherein the MAC code is unique to each transmitter and is generated using the first encryption key; wherein the one of said one or more further encryption keys (K; $K_{j,1}$, $K_{j,2}$, $K_{j,3}$, $K_{j,4}$) is transmitted a predetermined time after transmission of the MAC; and wherein the receiver is operable, upon receipt of all or part of the second radionavigation signal from one or more of the second group of transmitters, to authenticate a second radionavigation signal received from one of the second group of transmitters based on one of said one or more further encryption keys received from that transmitter or from any other transmitter of said second group of transmitters.

The receiver may be operable to authenticate the first radionavigation signal using the received one of said one or more further encryption keys or using another of said one or more further encryption keys derivable therefrom.

The receiver may be operable to authenticate the received second radionavigation signal based on the received encryption key upon receipt of at least the radionavigation data and MAC of that second radionavigation signal.

The or each second radionavigation signal may be in multiple parts, such that the encryption key is transmitted a predetermined delay after the radionavigation data and/or the MAC.

In one embodiment, the transmitted encryption key is the same for all transmitters within the second group. In another embodiment, the transmitted encryption key comprises, for each transmitter of the second group, a different one from said second key chain.

The first radio navigation signals and/or the second radio navigation signals may be transmitted such that portions of the signal comprising unpredictable bits are interleaved with portions comprising predictable bits.

According to another aspect of the invention there is provided a transmitter for a radio navigation system, the radio navigation system comprising a plurality of satellite-borne transmitters and at least one ground-based receiver, the receiver being adapted to receive radionavigation signals from each of a plurality of the transmitters, each of the transmitters and the receiver being adapted to access a predetermined first key chain, the first key chain comprising a first encryption key and one or more further encryption keys, the receiver being operable, upon receipt of all or part of the first radionavigation signal from one or more of the first group of transmitters, to authenticate a first radionavigation signal received from one of the transmitters based on one of the one or more further encryption keys received from that transmitter or from any other of said plurality of the transmitters, wherein: the transmitter is operable to transmit a first radio navigation signal, the first radionavigation signals including, at a given instant or for a given subframe, radionavigation data, a MAC, and one of the one or more further encryption keys; the MAC is unique to each transmitter and is generated using the first encryption key, and wherein the one of said one or more further encryption keys is transmitted a predetermined time after transmission of the MAC.

According to another aspect of the invention there is provided a receiver for a radio navigation system, the radio navigation system comprising a plurality of satellite-borne transmitters and at least the receiver, each of the transmitters and the receiver being adapted to access a predetermined first key chain, the first key chain comprising a first encryption key and one of said one or more further encryption keys, each transmitter being operable to transmit a first radio navigation signal, the first radionavigation signals including, at a given instant or for a given subframe, radionavigation data, a MAC, and one of the one or more further encryption keys; wherein the MAC is unique to each transmitter and is generated using the first encryption key; wherein the one of said one or more further encryption keys is transmitted a predetermined time after transmission of the MAC; wherein the receiver is adapted to receive radionavigation signals from each of the plurality of the transmitters, and wherein the receiver is operable, upon receipt of all or part of the first radionavigation signal from one or more of the transmitters, to authenticate the first radionavigation signal received from one of the transmitters based on one of the one or more further encryption keys received from that transmitter or from any other of said plurality of the transmitters.

According to another aspect of the invention there is provided a radio navigation method for a radio navigation system, the radio navigation system comprising a plurality of satellite-borne transmitters and at least one ground-based receiver, the receiver being adapted to receive radionavigation signals from each of a plurality of the transmitters, the method comprising: providing to each of the transmitters and to the receiver access to a predetermined first key chain, the first key chain comprising a first encryption key and one or more further encryption keys, transmitting, from each of said plurality of transmitters, a first radio navigation signal, the first radionavigation signals including, at a given instant or for a given subframe, radionavigation data, a MAC, and one of said one or more further encryption keys, the MAC being unique to each transmitter and being generated using the first encryption key, wherein the one of said one or more further encryption keys is transmitted a predetermined time after transmission of the MAC; receiving, at the receiver, all or part of the first radionavigation signal from one or more of said plurality of transmitters, and authenticating, at the receiver, a first radionavigation signal received from one of said plurality of transmitters based on one of said one or more further encryption keys received from that transmitter or from any other transmitter in said plurality of transmitters.

According to another aspect of the invention there is provided a recordable, rewritable or storable medium having recorded or stored thereon data defining or transformable into instructions for execution by processing circuitry.

According to another aspect of the invention there is provided a server computer incorporating a communications device and a memory device and being adapted for transmission on demand or otherwise of data defining or transformable into instructions for execution by processing circuitry.

Embodiments of the invention provide an optimized implementation of the TESLA protocol for radionavigation authentication. Embodiments of the present invention use a single one-way chain for all or a plurality of radionavigation signal transmitters, as opposed to the use of a single one-way chain for each radionavigation signal transmitter. Embodiments of the invention can be summarized as follows. (In this document, "transmitter" and "sender" are used interchangeably.)

1) A radionavigation system performs the following steps (sender side):
   From an initial seed $K_n$, a single chain of keys $K_n$ to $K_0$ generated recursively through a one-way function H is computed by the system, according to the TESLA protocol;
   The keys composing said one-way chain are used in reverse order ($K_0$ to $K_n$) to authenticate the sender data from the plurality of senders in the following way:
      at a certain time period j, the system uses a single key of the said chain $K_j$;
      the said single key $K_j$ is used to authenticate the current or recent data $D_i$ transmitted by each sender i of a plurality of senders, generating a message authentication code $MAC_{(j,i)}$ which is a priori different for each sender i;
      the senders transmit, in addition to its own navigation data $D_i$, the said message authentication code $MAC_{(j,i)}$ generated with the same single key $K_j$ for all senders, and sometime later, the said single key $K_j$ from all senders.

2) A radionavigation receiver performs the following steps:
   the navigation data $D_i$ from each visible sender are received and stored;
   the said message authentication codes $MAC_{(j,i)}$ from said senders from the system are received and stored;
   once the said single key $K_j$ is successfully received from all senders, some of them, or any of them, is used to verify the authenticity of the navigation data $D_i$ from each sender by generating the message authentication codes $MAC_{(j,i)}$ previously received;
   the receiver is able to verify the authenticity of the said single key $K_j$ applicable at the said interval by executing the one-way function that relates it to a previous key in the chain between $K_{j-1}$ and $K_0$, whose authenticity is certified from a certificate previously received from any, some or all of the said senders, or any other means.

An advantage of the invention is the performance improvement in radionavigation services by the use of a single key, or keys from the same chain, from several radionavigation signal transmitters.

A further advantage is that the system can authenticate the radionavigation data and signal of a certain sender by using the data and MAC from such a sender, while using the key from the said sender or any other sender, if the key from the said sender is not properly demodulated from the radionavigation signal. A consequent advantage is to drastically reduce the authentication error rate (AER) in degraded reception conditions: by allowing all the satellites to be authenticated through the same key or the same chain, a user needs to receive only a correct key from one satellite every subframe to authenticate all satellites. This reduces dramatically the amount of bits required for a position and time fix computed using authenticated senders.

In embodiments, the use of a single chain is not only beneficial for reducing the authentication error rate in stationary conditions (i.e. after a previous key of the chain is certified as correct), but it also assists initialization, as only one certified key received from any sender or any other source is required.

In addition to the above, embodiments of the invention are especially advantageous where one or few satellites are observed in good reception conditions with a low bit error rate, surrounded by other lower elevation or worse visibility satellites with a much higher bit error rate, as the receiver can use the key from the good visibility satellites to authenticate the bad visibility satellites as long as the few MAC bits are received from the bad visibility satellites, as opposed to needing to receive the key from each bad visibility satellite to be authenticated.

BRIEF DESCRIPTION OF THE DRAWINGS

Embodiments of the invention will now be described by way of reference example to the accompanying drawings, in which.

DETAILED DESCRIPTION

In the following, like numerals will be used to denote like elements.

Figure 1:
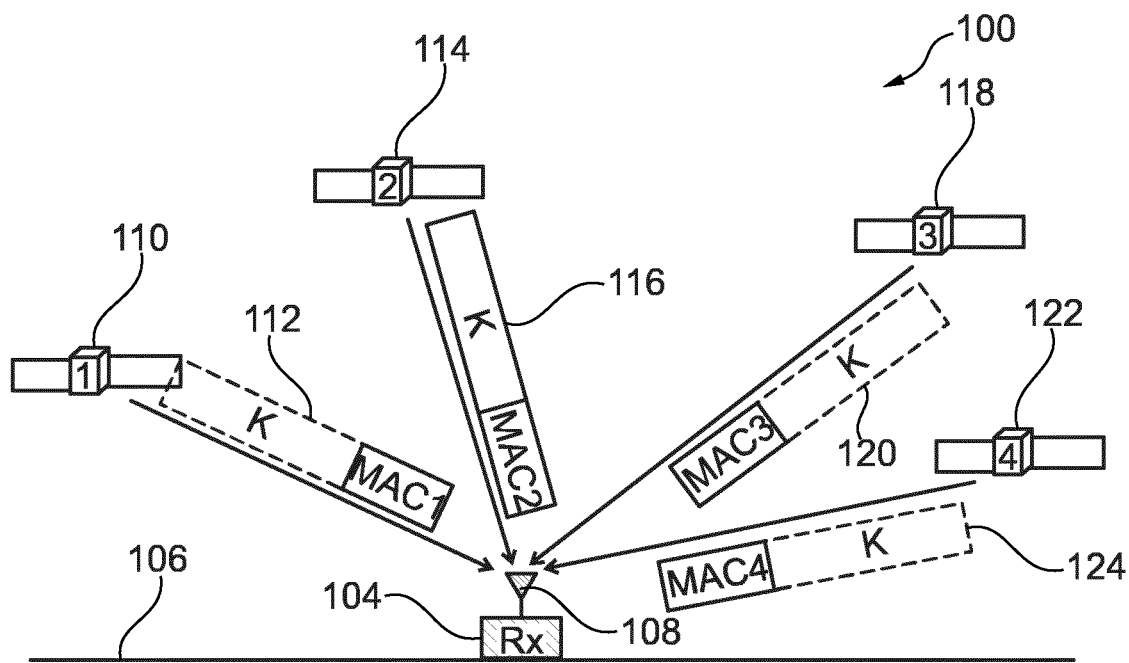
FIG. 1 is a schematic illustration of a radionavigation system according to an embodiment of the invention.

FIG. 1 is a schematic illustration of a radionavigation system 100 according to an embodiment of the invention, whereby each satellite is transmitting first its own MAC and then the same key K. This embodiment optimizes authentication availability by minimizing AER, by reducing the number of bits required to be demodulated from all satellites to calculate a position and time fix using at least four satellites.

Transmitters (not shown) on multiple satellites transmit respective radionavigation signals, which are received at receiver 104 based on the ground 106 via antenna 108. (In this embodiment, 4 satellites are shown; however, persons skilled in the art will appreciate that more satellites, or fewer, may be used in practice. In this document, for the purposes of explanation, "satellite" and "transmitter" may be used interchangeably.)

A first satellite 110 transmits a first radionavigation signal 112 which includes a MAC code MAC1 that uniquely corresponds to first satellite 110, followed by key K. A second satellite 114 transmits a second radionavigation signal 116 which includes a MAC code MAC2 that uniquely corresponds to second satellite 114, followed by key K. A third satellite 118 transmits a third radionavigation signal 120 which includes a MAC code MAC3 that uniquely corresponds to third satellite 114, followed by key K. A fourth satellite 122 transmits a fourth radionavigation signal 124 which includes a MAC code MAC4 that uniquely corresponds to fourth satellite 122, followed by key K.

The desired result of this embodiment—minimization of AER—implies that, given that NMA must work for all kinds of users and reception environments, the NMA solution must be optimized to work in difficult reception conditions. It should be noted that standard mass-market receivers are able to combine message blocks from different sub-frames to compose a full navigation data structure. This is not possible for NMA, where the totality of the authentication bits must be correctly received in one single subframe, as they will be different in different subframes to improve robustness.

The following notation and terminology is used:
$K_n$: one-way chain seed, i.e. the first value of the one-way chain;
$K_0$: one-way chain root, i.e. the last value of the one-way chain (or the most recent value certified as correct by the $K_0$ certificate);
$K_j$: key associated to all MACs transmitted at a certain subframe j;
$MAC_i$: Message Authentication Code generated authenticating data from satellite i and transmitted in satellite i navigation signal;
H: one-way function used to compute the chain, so that $K_0 = H^n(K_n)$, where $H^n$ means performing function H recursively n times; and
$K_{j,i}$: key transmitted by satellite i in subframe j.

With these assumptions, reference is made again to FIG. 1, and the procedure for this embodiment may be described as follows.

At a certain 30-second period associated with a certain key K, each satellite i transmits a $MAC_i$ using $K_j$ and the satellite data, or a subset of it $D_i$. The data $D_i$ to be authenticated may include at least the satellite time, orbits and clocks and it may append as well other information as the satellite ID, as context information, ionospheric corrections, time offsets to other satellite constellations or time references as UTC, or signal broadcast group delays.

After the transmission of $MAC_i$, the satellites transmit all the same key K used to generate each of the $MAC_i$. That is, the key K is transmitted a predetermined time after the transmission of $MAC_i$. In practice, this may mean transmission of the key K commences a predetermined time after the finalization of the transmission of $MAC_i$. The predetermined time may be of the order one or few milliseconds to several minutes, and more preferably of the order one to less than 30 seconds, in order to fit in the 30-second period.

The receiver 104 is required to demodulate successfully only one key K to compute a data-authenticated position, velocity and timing (PVT). As shown in FIG. 1, by receiving K from satellite 2 (labeled 114)—the one at the highest elevation and therefore with a-priori better visibility conditions—the data from all other satellites 110, 118 and 122 can be authenticated if only the MACs thereof (MAC1, MAC3, MAC4, respectively) are received.

In embodiments, the system adopts one, some or all of the following design parameters.

- The one-way chain uses a function of the SHA-2 family, for example SHA-256, or SHA-224, which essentially is a SHA-256 whereby the last bits are dropped, to compose a chain of keys (K) of length of 224 bits. This allows a sufficient level of security (112 symmetric bits) according to security standards. Longer or shorter keys can be used, depending on the security requirements on the system.
- The MAC primitive may be HMAC-256.
- The MAC transmitted by the satellites may be truncated to the last 15 bits. The probability of correctly guessing a 15-bit MAC without having the key is around $3*10^{-5}$, which is considered as sufficiently low to discourage such attacks.
- The key period may be 30 seconds.
- The chain length is 1 week, leading to a number of keys of 20160 keys.

However, it will be appreciated by persons skilled in the art that other values may be adopted, according to other embodiments and depending on the implementation.

Figure 2:
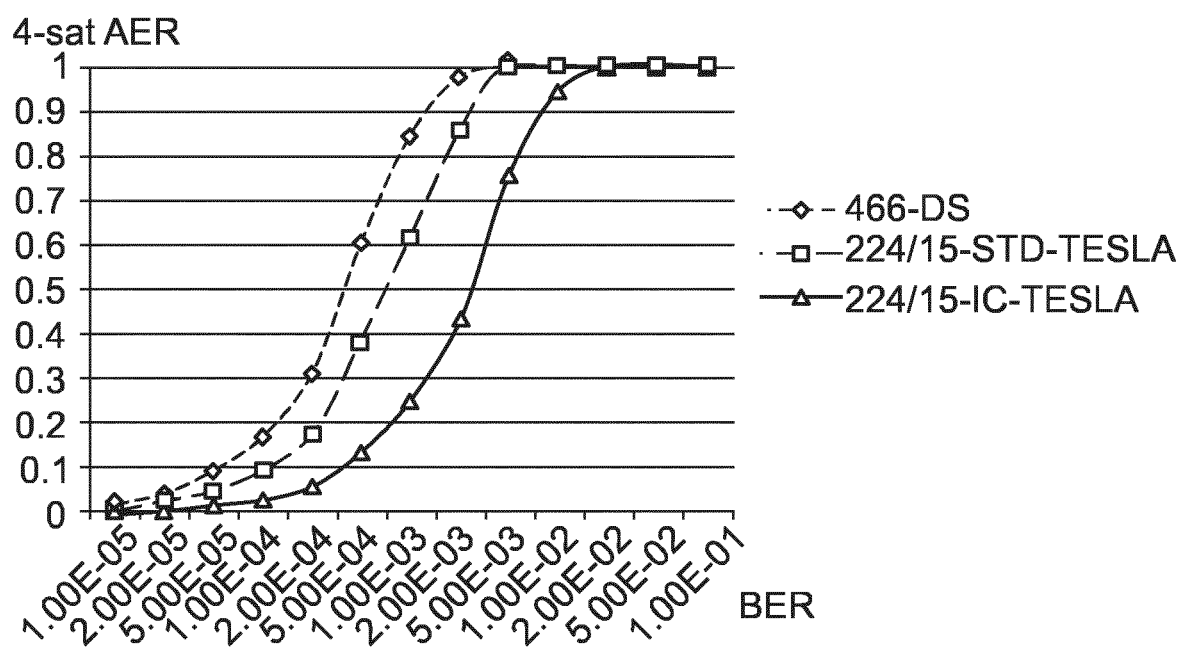
FIG. 2 shows plots of Authentication Error Rate (AER) performance for a given Bit Error Rate (BER), for the embodiment of FIG. 1 and other known implementations.

FIG. 2 shows AER performance for a given Bit Error Rate (BER), for the embodiment of FIG. 1 and other known implementations. For comparison purposes, FIG. 2 presents the AER performance, for three NMA implementations

- NMA through standard 466-bit digital signature, one per satellite;
- NMA through a standard TESLA protocol approach, with one different 224-bit key and 15-bit truncated MAC per satellite; and
- NMA through the single chain TESLA approach according to the present embodiment, with the same 224-bit key from all satellites and 15-bit truncated MACs.

In FIG. 2, AER is calculated from BER and NA through the following formula:

$$AER=1-(1-BER)^{NA},$$

where BER is the bit error rate and NA is the number of bits required for authentication. FIG. 2 should be interpreted in the following way: assuming that there are 4 satellites (110, 114, 118, 122) in view of receiver 104 with a given BER, the value "4-sat AER" is the probability that 4 satellites are navigation-message-authenticated allowing to calculate a NM-authenticated position and time value (the latter being referred to occasionally as PVT). It is assumed in all cases that the receiver 104 has already received the navigation data to authenticate. The results show a significant improvement through the use of the embodiment of the present invention (solid trace "224/15-1C-TESLA") compared to the other, existing methods. For example, by using 4 satellites to compute a position and time fix:

Authentication bits required through standard digital signatures using a 466-bit elliptic curve signature: 446*4=1864 bits.
Authentication bits required through standard TESLA case using a 15-bit truncated MAC and a 224-bit key: (15+224)*4=956 bits.
Authentication bits required through the current embodiment of the invention (15-bit truncated MAC+224-bit key): 15*4+224=284 bits.

This bit difference is even higher if more than 4 satellites are used for the position and time computation, which is the standard case. For example, if 7 satellites are used, the difference would be 1673 bits in the standard TESLA case vs. 329 bits for an embodiment of the present invention, i.e. five times less.

Figure 3:
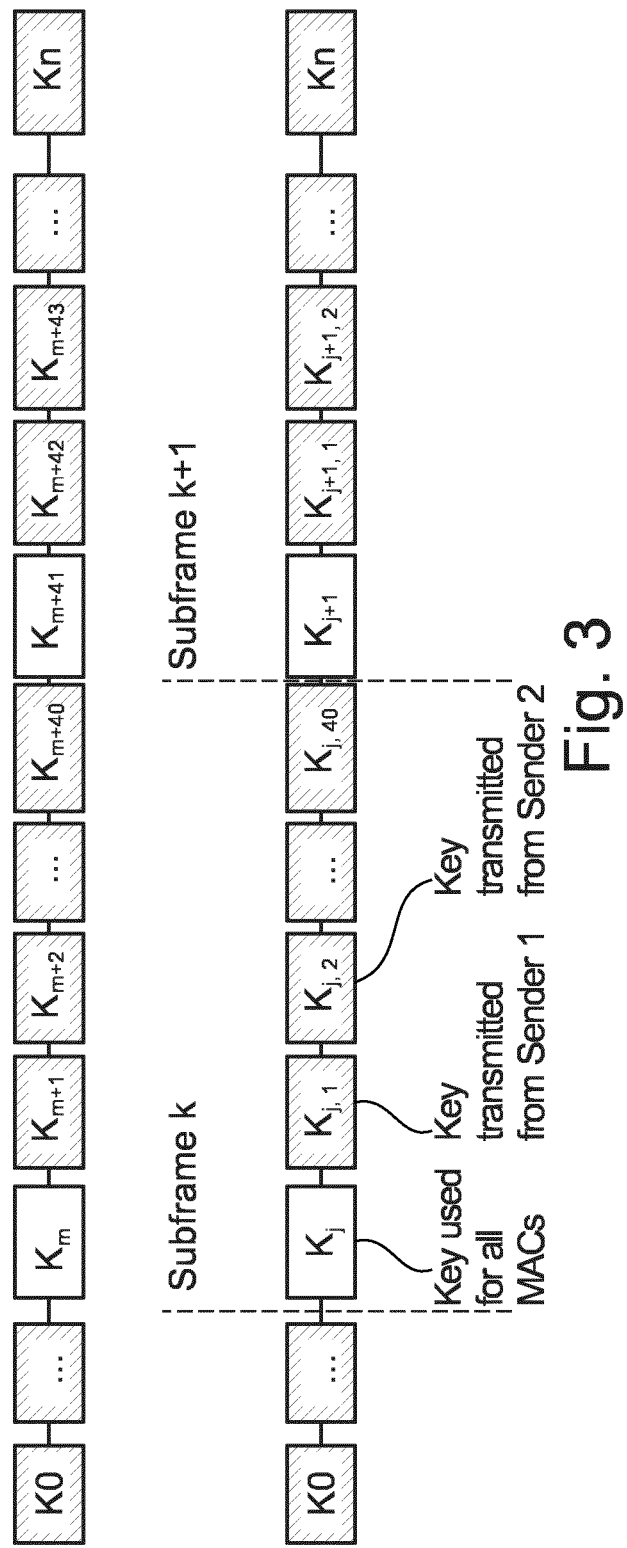
FIG. 3 is a schematic illustration of the techniques underlying a radionavigation system according to another embodiment of the invention that illustrates the use of keys from a single chain to transmit different keys from different satellites.

FIG. 3 is a schematic illustration of a radionavigation system according to another embodiment of the invention that illustrates the use of keys from a single chain to transmit different keys from different satellites, in order to increase signal unpredictability features. This is the same as the embodiment of FIG. 1, except as described as follows.

This embodiment is directed toward the maximization of robustness against replay attacks by increasing the features that make the signal unpredictable, while maintaining the same advantages of using a single one-way chain, as in the previous embodiment. Maximization of navigation symbol or bit unpredictability provides robustness against signal replay attacks; provided that the unpredictable symbols need to be later verified as correct by the authentication process.

One phenomenon that arises when using a single one-way chain for all satellites (110, 114, 118, 122; FIG. 1) is that, if the same key is used and transmitted at the same time from all satellites, it will be received at different times by users (at receiver 104), due to satellite clock offsets and, principally, due to the time of arrival related to the distance from the satellites to the receiver 104. For example, the signal from a satellite at the zenith at a height of 23.200 km will take to arrive to the Earth surface approximately 77.3 ms. However, a signal from a satellite in the same or a similar circular orbit but at a lower elevation, will take some more milliseconds to arrive to the Earth surface (always less than 21 ms for terrestrial users, equivalent approximately to the Earth radius at light speed). An attacker could use these milliseconds to estimate the unpredictable bits composing the TESLA key from the highest satellite and replay them with a delay from another one, facilitating the spoofing of the position even if the data used is authentic through modification of the signal time of arrival.

Therefore, if all satellites are transmitting the same key at the same time, only the symbols from the satellite closest to the zenith will be unpredictable, as an attacker could estimate them and replay them in the signal from satellites at lower elevations.

This problem can be overcome by increasing the length of the key chain and transmitting different keys, but still from the same chain, from different satellites. The keys would allow determination of the key $K_j$ used for the computation of all the MACs at a certain subframe by performing the one-way function.

In the embodiment of FIG. 3, the following MAC vs. KEY relationship is used.

For every subframe j, a single key is used to compute all MACs transmitted by all satellites. This key is a 40-times one way function of the key used on the previous subframe j−1:

$$K_j = H^{40}(K_j-1).$$

Note that 40 has been used to accommodate 40 keys per subframe: one that will be used for the MACs (k, k+1, etc.), and another 39 that can be used by 39 satellites. This provides enough margin to accommodate all satellites from a GNSS constellation.

For every subframe j, each satellite i transmits a MAC based on the key $K_j$, so that $$MAC_{(j,i)} = M(d_{j,i} \| m_i, K_j),$$

where M is the MAC function HMAC-SHA-224 truncated to 15 bits, $d_{j,i}$ is the additional information (at least SVID and system time) that makes the HMAC result unique, and $m_i$ is the navigation data to sign.

For every subframe j, each satellite i transmits a key $K_{j,i}$ so that $$K_{j,i} = H^i(K_j).$$

Thus, for example, satellite SVID5 will transmit a key ($K_{j,5}$) that needs to be hashed 5 times to obtain $K_j$. In this way, the MAC from any satellite can be verified against any key received from any other satellite. On the other hand, all bits from all $K_j$ that are transmitted every subframe will still be unpredictable. It should be noted that the additional burden of having 40 one-way functions per subframe to keep this bit unpredictability feature seems affordable for standard and future receivers.

As seen in FIG. 3, using keys from a single chain, different keys are transmitted from different satellites. The first chain shows that, for each subframe, the keys between $K_m$ and $K_m+41$ are allocated to a single subframe and a whole satellite constellation. The second chain shows that the first key $K_j$, equivalent to $K_m$ in the previous chain, is used to compute the MACs from all satellites, whereas $K_{j,i}$ is the key transmitted by satellite i, with i being between 1 and 40 in this embodiment.

Using this approach, a receiver 104 can receive a single key $K_{j,i}$ and perform the one-way function i times to determine the key $K_j$ used to compute the MACs. At the same time, the keys $K_{j,i}$ transmitted by each satellite i cannot be predicted, maximizing robustness against signal replay.

Figure 4:
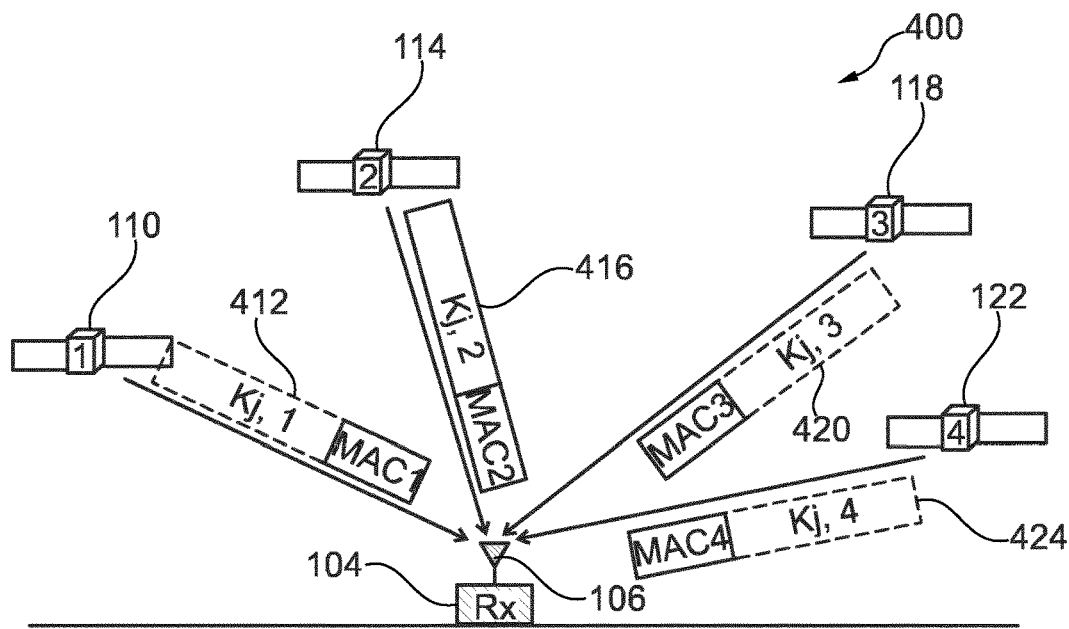
FIG. 4 is a schematic illustration of a radionavigation system according to another embodiment of the invention, whereby each satellite is transmitting a different key ($K_{j,1}$, $K_{j,2}$, etc.) from the same chain, these being the chain keys used as shown in FIG. 3.

FIG. 4 is a schematic illustration of a radionavigation system 400 according to another embodiment of the invention, whereby each satellite is transmitting a different key ($K_{j,1}$, $K_{j,2}$, etc.) from the same chain at a certain subframe. This is the same as the embodiment of FIG. 1, except as described as follows. Suitably, this embodiment uses the chain keys as presented in FIG. 3.

A first satellite 110 transmits a firsts radionavigation signal 412 which includes a MAC code MAC1 that uniquely corresponds to first satellite 110, followed by key $K_{j,1}$. A second satellite 114 transmits a second radionavigation signal 416 which includes a MAC code MAC2 that uniquely corresponds to second satellite 114, followed by key $K_{j,2}$. A third satellite 118 transmits a third radionavigation signal 420 which includes a MAC code MAC3 that uniquely corresponds to third satellite 114, followed by key $K_{j,3}$. A fourth satellite 122 transmits a fourth radionavigation signal 424 which includes a MAC code MAC4 that uniquely corresponds to fourth satellite 122, followed by key $K_{j,4}$.

As discussed, if the receiver 104 receives the MACs (MAC1, MAC2, MAC3, MAC4) from the 4 satellites 110, 114, 118, 122, and only the key from the highest satellites ($K_{j,2}$), it can calculate $K_j$ ($K_j = H^2(K_{j,2})$) and therefore verify the data from the satellites against the MACs, as well as verify the robustness against signal replay from each of the signals.

Those keys that are transmitted in a certain subframe but cannot be computed from the keys correctly demodulated in this subframe (e.g. $K_{j,3}$ and $K_{j,4}$ in FIG. 4), can be computed from any key from any satellite received in any of the following subframes. For example: $K_{j,3} = H^{41}(K_{j+1,4})$.

In another embodiment, instead of the totality of the senders (satellites 110, 114, 118, 122) sending the same key $K_j$ (see embodiment of FIG. 1), there may exist two or more groups of senders, each sender within a group using different keys—from different one-way chains for each group. This embodiment can enhance security as, for key management or other reasons, it may be considered more secure to avoid the use of a single key from all senders.

In another embodiment, the same key $K_j$ is encoded differently from each sender (satellites 110, 114, 118, 122) and in a way that is unpredictable to the receiver 104 until the totality of the encoded key information is received. This may be achieved, for example, by the encoding of $K_j$ and a nonce through a substitution and permutation network, and the transmission of the nonce, which should be different and unpredictable for each satellite, together with the key $K_j$.

In another embodiment, operation involves spreading bit and symbol unpredictability in the transmitted data stream. This has the advantage of the increasing of robustness against replay attacks.

Figure 5:
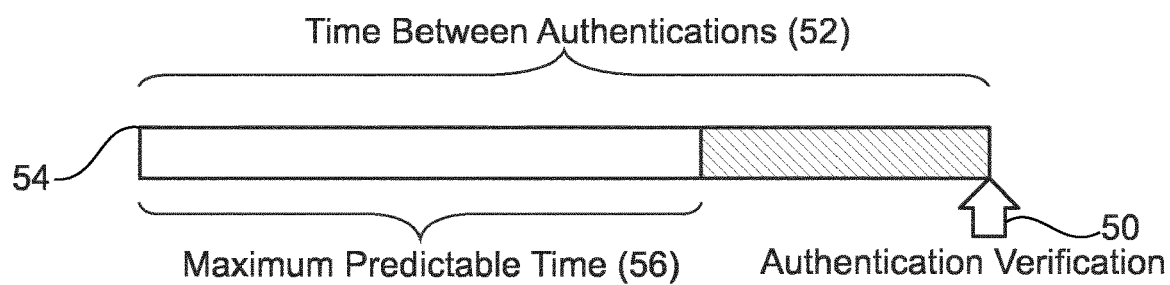
FIG. 5 illustrates a classic implementation of the transmission of navigation data authentication.

FIG. 5 illustrates a classic implementation of the transmission of navigation data authentication. More particularly, FIG. 5 shows the implementation whereby the unpredictable information bits, as the digital signature, are transmitted altogether. Authentication 50 occurs a time 52 after transmission 54. This leads to a maximum predictable time 56 that lasts most of the time 52 between authentications. The maximum predictable time 56 is the time during which an attacker could take control of the tracking loops before a signal replay attack. Therefore, the shorter the maximum predictable time 56, the more robust the receiver 104 can be against this type of attacks.

Figure 6:
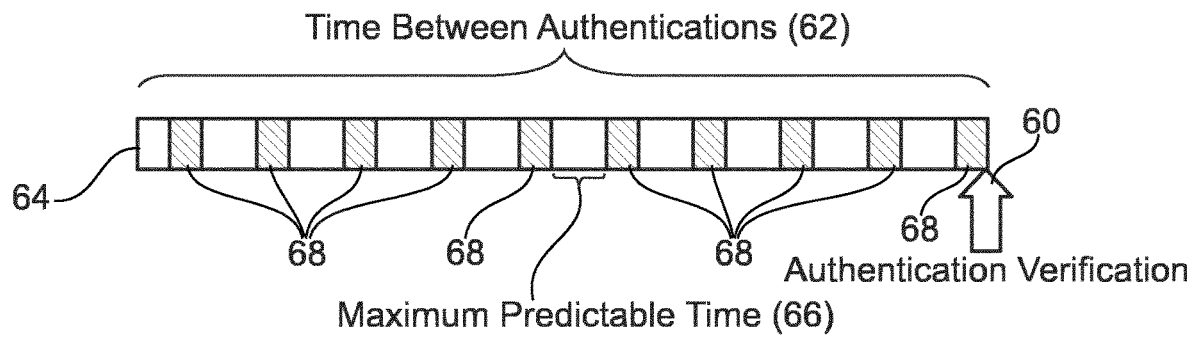
FIG. 6 is a schematic illustration of the concept underlying another embodiment of the invention whereby unpredictable and predictable bits are interleaved in order to minimize maximum predictable time.

FIG. 6 is a schematic illustration of the concept underlying another embodiment of the invention, in relation to the transmission of navigation data authentication, whereby the unpredictable and predictable bits are interleaved in order to minimize maximum predictable time 66. This is the same as the embodiment of FIG. 1, except as described as follows.

Authentication 60 occurs a time 62 after transmission 64. The embodiment of FIG. 6 increases robustness against signal replay. To provide such protection, unpredictable bits 68 have to be verified in the authentication verification performed once the data to be authenticated and the data used for authentication are completely received. This can be done for the data, MAC and key of a certain satellite, as well as with the $K_0$ certificate, if transmitted in the signal. Therefore, in the present embodiment, data bits that can be considered unpredictable are:

the key $K_j$;
the MACs MAC1, MAC2, etc.; and
the digital signature of a certificate, $DS(K_0)$, transmitted in the signal to certify the authenticity of $K_0$ (the root key of the chain) by an asymmetric encryption scheme.

The purpose of the $K_0$ certificate verification may be twofold: first, to ensure that the MAC and key are $K_j$ correct, and second, to increase protection against signal replays. If $K_0$ certificates including an unpredictable digital signature are continuously transmitted, this allows the performance of more anti-replay verifications in a way that the satellite can continuously transmit unpredictable bits that are later verified.

While embodiments have been described by reference to embodiments having various components in their respective implementations, it will be appreciated that other embodiments make use of other combinations and permutations of these and other components.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Thus, while there has been described what are believed to be the preferred embodiments of the invention, those skilled in the art will recognize that other and further modifications may be made thereto without departing from the spirit and scope of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A radio navigation system, comprising a plurality of satellite-borne transmitters and at least one ground-based receiver, the receiver being adapted to receive radio navigation signals from each of a plurality of the transmitters, each of the transmitters and the receiver being adapted to access a predetermined first key chain, the first key chain comprising a first encryption key and one or more further encryption keys, wherein:
   each of a first group of transmitters from said plurality of transmitters being operable to transmit a first radio navigation signal, the first radio navigation signals including, for a given subframe, radio navigation data, a message authentication code (MAC), and a one of said one or more further encryption keys;
   wherein each MAC is unique to each transmitter and is generated using said first encryption key;
   wherein in each first radio navigation signal, the one of said one or more further encryption keys is transmitted a predetermined time after transmission of the MAC, and
   wherein the receiver is operable, upon receipt of the first radio navigation signal from one or more of the first group of transmitters, to authenticate a first radio navigation signal received from one of the first group of transmitters based on the radio navigation data, the MAC received from said one transmitter and on one of said one or more further encryption keys received from that transmitter or from any other transmitter in said first group of transmitters.

2. The radio navigation system of claim 1, wherein the receiver is operable to authenticate the first radio navigation signal using the received one of said one or more further encryption keys or using another of said one or more further encryption keys derivable therefrom.

3. The radio navigation system of claim 1, wherein the receiver is operable to authenticate the received first radio navigation signal based on the received one of said one or more further encryption keys upon receipt of at least the radio navigation data and MAC of that first radio navigation signal.

4. The radio navigation system of claim 1, wherein the transmitted encryption key is the same for all transmitters within the first group.

5. The radio navigation system of claim 1, wherein the transmitted encryption key comprises, for each transmitter of the first group, a different one from said first key chain.

6. The radio navigation system of claim 5, wherein, for each subframe of the first radio navigation signal, each encryption key of said first key chain comprises one of n encryption keys recursively derived from a one way function.

7. The radio navigation system of claim 6, wherein where n is greater than the total number of satellite-borne transmitters in said radio navigation system.

8. The radio navigation system of claim 1, wherein, for each transmitter of the first group, a respective one of the one or more further encryption keys is derived from a root key of the first key chain.

9. The radio navigation system of claim 1, wherein the receiver is adapted to authenticate the received radio navigation signal by generating a derived MAC code based the received radio navigation data and the received one of said one or more further encryption keys and comparing the derived MAC with the received MAC.

10. The radio navigation system of claim 1, wherein the first group of transmitters comprises all of said plurality of transmitters in the radio navigation system.

11. The radio navigation system of claim 1, wherein first group of transmitters comprises a strict subset of said plurality of transmitters in the radio navigation system.

12. The radio navigation system of claim 11, wherein the remaining transmitters comprise a second group of transmitters, and wherein a predetermined second key chain is accessible by the second group of transmitters and the receiver, the second key chain comprising a first encryption key and one or more further encryption keys.

13. The radio navigation system of claim 12, wherein:
   each transmitter in the second group is operable to transmit a second radio navigation signal, the second radio navigation signals including, for a given subframe, radio navigation data, a MAC, and one of said one or more further encryption keys;
   wherein the MAC is unique to each transmitter and is generated using the first encryption key,
   wherein the one of said one or more further encryption keys is transmitted a predetermined time after transmission of the MAC, and
   wherein the receiver is operable, upon receipt of the second radio navigation signal from one or more of the second group of transmitters, to authenticate a second radio navigation signal received from one of the second group of transmitters based on the radio navigation data, the MAC received from said one transmitter and on one of said one or more further encryption keys received from that transmitter or from any other transmitter of said second group of transmitters.

14. The radio navigation system of claim 13, wherein the receiver is operable to authenticate the first radio navigation signal using the received one of said one or more further encryption keys or using another of said one or more further encryption keys derivable therefrom.

15. The radio navigation system of claim 14, wherein the receiver is operable to authenticate the received second radio navigation signal based on the received encryption key upon receipt of at least the radio navigation data and MAC of that second radio navigation signal.

16. The radio navigation system of claim 13, wherein the transmitted encryption key is the same for all transmitters within the second group.

17. The radio navigation system of claim 13, wherein the transmitted encryption key comprises, for each transmitter of the second group, a different one from said second key chain.

18. The radio navigation system of claim 1, wherein the first radio navigation signals are transmitted such that portions of the signal comprising unpredictable bits are interleaved with portions comprising predictable bits.

19. A satellite-borne transmitter for a radio navigation system,
wherein:
the radio navigation system comprises a plurality of the transmitters and at least one ground-based receiver;
the receiver is configured to receive radio navigation signals from each of the plurality of the transmitters;
the receiver is configured to access a predetermined first key chain,
wherein the first key chain comprises a first encryption key and one or more further encryption keys; and
the receiver is operable, upon receipt of a first radio navigation signal from one or more of the plurality of the transmitters, to authenticate a first radio navigation signal received from the one or more of the transmitters based on one of the one or more further encryption keys received from the one or more of the transmitters or from any other of said plurality of the transmitters, and
wherein the transmitter comprises processing circuitry and is configured to:
access the predetermined first key chain; and
transmit a first radio navigation signal,
wherein:
the first radio navigation signals includes, for a given subframe, radio navigation data, a MAC, and one of the one or more further encryption keys; and
the MAC is unique to the transmitter and is generated using the first encryption key; and
the transmitter further is configured to transmit the one of said one or more further encryption keys a predetermined time after transmission of the MAC.

20. A ground-based receiver of a radio navigation system, wherein:
the radio navigation system comprises a plurality of satellite-borne transmitters and the receiver;
each of the plurality of transmitters is configured to access a predetermined first key chain,
wherein the first key chain comprises a first encryption key and one or more further encryption keys; and
each of the plurality of transmitters is operable to transmit a first radio navigation signal,
wherein:
the first radio navigation signals includes, for a given subframe, radio navigation data, a MAC, and one of said one or more further encryption keys;
each MAC is unique to each of the plurality of transmitters and is generated using the first encryption key; and
in each first radio navigation signal, the one of said one or more further encryption keys is transmitted a predetermined time after transmission of the MAC, and
wherein the receiver comprises an antenna, processing circuitry, and is configured to:
access the predetermined first key chain; and
receive radio navigation signals from each of the plurality of the transmitters; and
upon receipt of the first radio navigation signal from one or more of the plurality of transmitters, authenticate the first radio navigation signal received from the one or more of the plurality of transmitters based on the MAC from said one or more of the plurality of transmitters and on one of said one or more further encryption keys received from the one or more of the plurality of transmitters or from any other of said plurality of transmitters.

21. A radio navigation method for a radio navigation system,
wherein:
the radio navigation system comprises a plurality of satellite-borne transmitters and at least one ground-based receiver; and
the receiver is adapted to receive radio navigation signals from each of the plurality of the transmitters,
the method comprising:
providing to each of the plurality of transmitters and to the receiver access to a predetermined first key chain,
wherein the first key chain comprises a first encryption key and one or more further encryption keys;
transmitting, from each of said plurality of transmitters, a first radio navigation signal,
wherein:
the first radio navigation signals include, for a given subframe, radio navigation data, a MAC, and one of said one or more further encryption keys;
the MAC being unique to each transmitter and being generated using the first encryption key; and
in each first radio navigation signal, the one of said one or more further encryption keys is transmitted a predetermined time after transmission of the MAC;
receiving, at the receiver, the first radio navigation signal from one or more of said plurality of transmitters; and
authenticating, at the receiver, a first radio navigation signal received from one of said plurality of transmitters based on the MAC received from said one of said plurality of transmitters and on one of said one or more further encryption keys received from the one of said plurality of transmitters or from any other transmitter in said plurality of transmitters.

22. A recordable computer memory including thereon computer data that defines executable instructions that are executable by computer processing circuitry to perform a radio navigation method for a radio navigation receiver of a radio navigation system,
wherein:
the radio navigation system comprises a plurality of satellite-borne transmitters and at least one ground-based receiver;
the receiver is adapted to receive radio navigation signals from each of the plurality of the transmitter; and
the radio navigation system is configured to:
provide to each of the plurality of transmitters and to the receiver access to a predetermined first key chain,
wherein the first key chain comprises a first encryption key and one or more further encryption keys;
transmit, from each of said plurality of transmitters, a first radio navigation signal, wherein:
the first radio navigation signals include, for a given subframe, radio navigation data, a MAC, and one of said one or more further encryption keys;
the MAC being unique to each transmitter and being generated using the first encryption key; and
in each first radio navigation signal, the one of said one or more further encryption keys is transmitted a predetermined time after transmission of the MAC;
receive, at the receiver, the first radio navigation signal from one or more of said plurality of transmitters; and
authenticate, at the receiver, a first radio navigation signal received from one of said plurality of transmitters based on the MAC received from said one of said plurality of transmitters and on one of said one or more further encryption keys received from the one of said plurality of transmitters or from any other transmitter in said plurality of transmitters;
wherein the method comprises:
receiving, at the receiver, the first radio navigation signal from one or more of said plurality of transmitters; and
authenticating, at the receiver, the first radio navigation signal received from one of said plurality of transmitters based on the MAC received from said one of said plurality of transmitters and on one of said one or more further encryption keys received from said one of said plurality of transmitters or from any other transmitter in said plurality of transmitters.

23. A recordable computer memory including thereon computer data that defines executable instructions that are executable by computer processing circuitry to perform the radio navigation method for a radio navigation transmitter in a radio navigation system,
wherein:
the radio navigation system comprises a plurality of satellite-borne transmitters and at least one ground-based receiver;
the receiver is adapted to receive radio navigation signals from each of the plurality of the transmitter; and
the radio navigation system is configured to:
provide to each of the plurality of transmitters and to the receiver access to a predetermined first key chain;
wherein the first key chain comprises a first encryption key and one or more further encryption keys; and
transmit, from each of said plurality of transmitters, a first radio navigation signal,
wherein:
the first radio navigation signals include, for a given subframe, radio navigation data, a MAC, and one of said one or more further encryption keys;
the MAC being unique to each transmitter and being generated using the first encryption key; and
in each first radio navigation signal, the one of said one or more further encryption keys is transmitted a predetermined time after transmission of the MAC;

receive, at the receiver, the first radio navigation signal from one or more of said plurality of transmitters; and
authenticate, at the receiver, a first radio navigation signal received from one of said plurality of transmitters based on the MAC received from said one of said plurality of transmitters and on one of said one or more further encryption keys received from the one of said plurality of transmitters or from any other transmitter in said plurality of transmitters;
wherein the method comprises
transmitting, from each of said plurality of transmitters, the first radio navigation signal.

24. A ground-based receiver of a radio navigation system configured to perform a receiver method,
wherein:
the radio navigation system comprises a plurality of satellite-borne transmitters and at least one ground-based receiver;
the receiver is adapted to receive radio navigation signals from each of the plurality of the transmitter; and
the radio navigation system is configured to:
provide to each of the plurality of transmitters and to the receiver access to a predetermined first key chain,
wherein the first key chain comprises a first encryption key and one or more further encryption keys;
transmit, from each of said plurality of transmitters, a first radio navigation signal,
wherein:
the first radio navigation signals include, for a given subframe, radio navigation data, a MAC, and one of said one or more further encryption keys;
the MAC being unique to each transmitter and being generated using the first encryption key; and
in each first radio navigation signal, the one of said one or more further encryption keys is transmitted a predetermined time after transmission of the MAC;
receive, at the receiver, the first radio navigation signal from one or more of said plurality of transmitters; and
authenticate, at the receiver, a first radio navigation signal received from one of said plurality of transmitters based on the MAC received from said one of said plurality of transmitters and on one of said one or more further encryption keys received from the one of said plurality of transmitters or from any other transmitter in said plurality of transmitters;
wherein said receiver comprises:
at least one processor; and
at least one recordable computer memory including thereon computer data that defines executable instructions,
wherein the at least the computer data, when executed by the at least one processor, cause the receiver at least to perform:
receiving, at the receiver, the first radio navigation signal from one or more of said plurality of transmitters; and
authenticating, at the receiver, the first radio navigation signal received from one of said plurality of transmitters based on the MAC received from said one of said plurality of transmitters and on one of said one or more further encryption keys received from the one of said plurality of transmitters or from any other transmitter in said plurality of transmitters.

25. A satellite-borne transmitter of a radio navigation system configured to perform a transmission method, wherein:
    the radio navigation system comprises a plurality of satellite-borne transmitters and at least one ground-based receiver;
    the receiver is adapted to receive radio navigation signals from each of the plurality of the transmitter; and
    the radio navigation system is configured to:
        provide to each of the plurality of transmitters and to the receiver access to a predetermined first key chain,
        wherein the first key chain comprises a first encryption key and one or more further encryption keys;
        transmit, from each of said plurality of transmitters, a first radio navigation signal,
        wherein:
            the first radio navigation signals include, for a given subframe, radio navigation data, a MAC, and one of said one or more further encryption keys;
            the MAC being unique to each transmitter and being generated using the first encryption key; and
            in each first radio navigation signal, the one of said one or more further encryption keys is transmitted a predetermined time after transmission of the MAC;
        receive, at the receiver, the first radio navigation signal from one or more of said plurality of transmitters; and
        authenticate, at the receiver, a first radio navigation signal received from one of said plurality of transmitters based on the MAC received from said one of said plurality of transmitters and on one of said one or more further encryption keys received from the one of said plurality of transmitters or from any other transmitter in said plurality of transmitters;
    wherein said transmitter comprises:
        at least one processor; and
        at least one recordable computer memory including thereon computer data that defines executable instructions,
        wherein the computer data, when executed by the at least one processor, is configured to cause the transmitter at least to perform
            transmitting, from each of said plurality of transmitters, the first radio navigation signal.

* * * * *